(12) United States Patent
Nakabayashi et al.

(10) Patent No.: US 7,156,237 B2
(45) Date of Patent: Jan. 2, 2007

(54) ARTICLES SEPARATING AND SUPPLYING APPARATUS AND METHOD

(75) Inventors: Kenichi Nakabayashi, Tsurugashima (JP); Kazuhiko Goto, Tsurugashima (JP)

(73) Assignee: Daisey Machinery Co., Ltd., Saitama-ken (JP)

( * ) Notice: Subject to any disclaimer, the term of this patent is extended or adjusted under 35 U.S.C. 154(b) by 240 days.

(21) Appl. No.: 10/715,514

(22) Filed: Nov. 19, 2003

(65) Prior Publication Data

US 2004/0112803 A1    Jun. 17, 2004

(30) Foreign Application Priority Data

Dec. 12, 2002    (JP) ............................. 2002-360796

(51) Int. Cl.
*B07C 5/00*    (2006.01)
(52) U.S. Cl. ...................... 209/551; 209/657; 209/922; 209/923; 198/461.1; 198/461.2
(58) Field of Classification Search ................ 209/657, 209/551, 922; 198/459.5, 459.6, 460.1
See application file for complete search history.

(56) References Cited

U.S. PATENT DOCUMENTS 5,168,978 A * 12/1992 Cox et al. ................ 198/369.5
5,760,343 A * 6/1998 Arimoto et al. ......... 177/25.18
5,979,637 A * 11/1999 Iwamoto et al. ......... 198/465.1
6,375,406 B1 * 4/2002 Takahashi et al. ....... 414/798.9

FOREIGN PATENT DOCUMENTS

JP        10-264901       10/1998

* cited by examiner

*Primary Examiner*—Kathy Matecki
*Assistant Examiner*—Terrell Matthews
(74) *Attorney, Agent, or Firm*—Wenderoth, Lind & Ponack, L.L.P.

(57) ABSTRACT

An articles separating and supplying apparatus and method are provided by which, even in case of a size change of articles, articles of a predetermined number can be securely separated and supplied at a high speed. A transfer conveyor for transferring arrayed articles to be separated and supplied, and a separating conveyor, supported pivotably around a pivot, for receiving the articles from the transfer conveyor, are provided. A counter counts the number of articles transferred by the transfer conveyor. Upon the counter counting the predetermined number of the articles, a first stopper stops feeding-in of the articles transferred by the transfer conveyor. A second stopper is arranged to stop, at a front position of the articles of the predetermined number on the separating conveyor, feeding-out of the articles from the separating conveyor. The second stopper comprises an endless belt from which engaging members project. A stop position of the engaging members is changeable by movement of the endless belt.

21 Claims, 4 Drawing Sheets

ARTICLES SEPARATING AND SUPPLYING APPARATUS AND METHOD

BACKGROUND OF THE INVENTION

1. Field of the Invention

The present invention relates to an articles separating and supplying apparatus and method by which articles of a predetermined number to be packaged, are separated and differently positioned, to be supplied to a subsequent packaging process.

2. Description of the Prior Art

In a packaging machine, in a case where a plurality of articles to be packaged are arrayed in rows, with each row having a predetermined number of the articles, the articles are first separated into each row having the articles of the predetermined number and then the rows of a predetermined number are fed into a box or container to be packaged in one or more stages.

In a prior art packaging method in which such a plurality of arrayed articles are separated into each row having a predetermined number of the articles, it is customary to use an automatic separating apparatus that is called a channelizer obtainable on the market.

This automatic separating apparatus called the channelizer is constructed such that there is provided a plate member, that is called a plank, forming a transfer conveyor for transferring the articles and this plate member is laterally shifted along a separating guide. However, structure of this apparatus is complicated and expensive.

Also, in the prior art separating apparatus, it is usual that a number of the articles to be separated is counted by a counter and, upon the counter counting a predetermined number of the articles, feeding-in of the articles is stopped and then an automatic separating apparatus is operated to separate and supply the articles of the predetermined number. For this reason, counting of the articles to be next separated is started only after separation of the first counted articles and hence there is a problem that separation takes time.

Also, for a structural reason of the prior art separating apparatus, each time when articles to be handled are changed, an arrangement position of the counter must be changed and adjusted or a fitting position of a stopper for stopping feeding-in of the articles must be changed and adjusted, and this requires complicated and time-consuming work.

SUMMARY OF THE INVENTION

In view of the abovementioned problems in the prior art articles separating and supplying apparatus, it is an object of the present invention to provide an articles separating and supplying apparatus by which articles of a predetermined number to be packaged are separated and differently positioned to be supplied to a subsequent packaging process and in which, by a simplified structure and facilitated adjustment of the apparatus, separation and supply of the articles of the predetermined number can be securely performed even in case of a size change of the articles.

Also, it is an object of the present invention to provide an articles separating and supplying apparatus in which articles of a predetermined number to be packaged can be separated and supplied at a high speed.

Further, it is an object of the present invention to provide an articles separating and supplying method by use of the apparatus mentioned above.

In order to achieve these mentioned objects, the present invention provides an articles separating and supplying apparatus comprising: a transfer conveyor for transferring arrayed articles to be separated and supplied; a separating conveyor having its one end portion arranged to receive the articles to be separated as transferred by the transfer conveyor, with the separating conveyor being supported pivotably around one end portion as a pivotal center; a counter for counting a number of the articles received by the separating conveyor; a first stopper for stopping feeding-in of the articles transferred by the transfer conveyor, as soon as the counter counts a predetermined number of the articles; and a second stopper being arranged so as to stop, at a stop position that is a position of a front one of the articles of the predetermined number on the separating conveyor, feeding-out of the articles from the separating conveyor, with the second stopper having a stop position constructed so as to be changeable.

According to the articles separating and supplying apparatus of the present invention constructed as mentioned above, as soon as the articles of the predetermined number to be separated are received after the second stopper, the separating conveyor that has received the articles of the predetermined number to be separated is rotated to swing to a direction of separation, in which the articles are to be separated and supplied, around an articles receiving end portion as the pivotal center of the separating conveyor. Then, the articles of the predetermined number received after the second stopper are fed out in the direction of separation. Thus, separation and supply of the articles can be performed so as to enable the articles to be easily packaged.

Moreover, according to the articles separating and supplying apparatus of the present invention, the counter is provided to count the number of the articles transferred by the transfer conveyor and the second stopper is arranged to stop feeding-out of the articles at the stop position; that is, the position of the front one of the articles of the predetermined number on the separating conveyor. Hence, the articles of the predetermined number to be separated can be securely and correctly stored after the second stopper.

Also, according to the articles separating and supplying apparatus of the present invention, the stop position of the second stopper, as the position of the front one of the articles of the predetermined number on the separating conveyor, is constructed so as to be changeable. Thus, even if a size of the articles to be separated or the number of the articles to be separated is changed, the stop position of the second stopper can be easily adjusted and thereby the articles of the predetermined number can be securely received onto the separating conveyor.

In the articles separating and supplying apparatus of the present invention, operation thereof can be performed by steps of: causing the first stopper to stop feeding-in of the articles transferred by the transfer conveyor, as soon as the articles of the predetermined number are conveyed after the second stopper; and releasing the second stopper so that the articles of the predetermined number after the second stopper are fed out to a place of separation by the separating conveyor, as well as releasing the first stopper so that the articles of the predetermined number are fed in after the second stopper by the transfer conveyor. Accordingly, separation of the articles on the separating conveyor as well as receiving of the articles of the predetermined number to be separated onto the separating conveyor can be performed substantially at the same time and supply of the articles of the predetermined number from the separating conveyor can be securely performed.

In the articles separating and supplying apparatus of the present invention, if the second stopper comprises an endless belt and a stopper member projecting from the endless belt, and the second stopper has the stop position constructed so as to be changeable by movement of the endless belt, then the stop position of the second stopper can be easily adjusted to the position of the front one of the articles of the predetermined number received on the separating conveyor.

Also, in the above apparatus in which the second stopper comprises the endless belt and the stopper member projecting from the endless belt, if a plurality of these stopper members are arranged with an interval being maintained between each of them along a running direction of the endless belt, and also if the plurality of stopper members are constructed so that, while the articles of the predetermined number to be separated that have been stopped after one of the plurality of stopper members are being fed out to be separated, another one of the plurality of stopper members receives a front one of the articles of the predetermined number to be next separated and moves to a stop position of the second stopper to stop there, then an operation of separation of the articles of the predetermined number and an operation of receiving the articles to be next separated can be performed substantially at the same time and a speed of separation of the articles can be enhanced.

BRIEF DESCRIPTION OF THE DRAWINGS

FIGS. 1(a) and 1(b) show an entire construction of an articles separating and supplying apparatus of an embodiment according to the present invention, wherein FIG. 1(a) is a side view thereof and FIG. 1(b) is a side view showing only a conveyor portion thereof.

FIGS. 3(a) and 3(b) are side views showing a construction of a second stopper 18 of the apparatus of FIG. 1, wherein FIG. 3(a) shows a state where each four of packaged articles are separated and FIG. 3(b) shows a state where each three of two consecutively packaged articles are separated.

FIGS. 4(a) and 4(b) are side views the same as FIGS. 3(a) and 3(b), showing an operating state of the second stopper 18 of FIGS. 3(a) and 3(b), wherein FIG. 4(a) shows a position of an engaging member of the second stopper while the second stopper is being operated, and FIG. 4(b) shows a state where the engaging member is moved to a position near a front position of the articles of a predetermined number on the separating conveyor.

DESCRIPTION OF THE PREFERRED EMBODIMENT

Figure 1A:
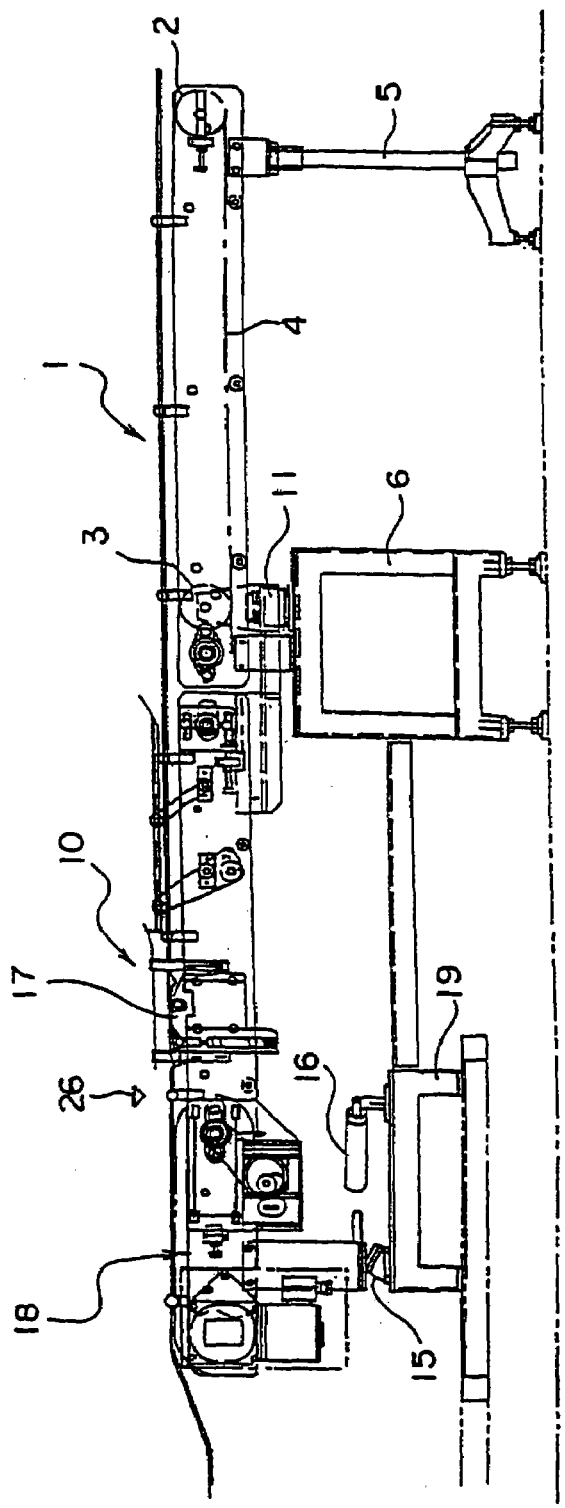

Herebelow, the present invention will be described more concretely based on an embodiment of an articles separating and supplying apparatus according to the present invention with reference to the appended drawings.

(Entire Construction)

An entire construction of the articles separating and supplying apparatus will be first described with reference to FIGS. 1(a) and 1(b). Numeral 1 designates a transfer conveyor that transfers articles to be separated and supplied, wherein the articles are arrayed in one row and placed on the transfer conveyor 1. The transfer conveyor 1 comprises two endless belt members 4 that are wound around pulleys 2, 3 for transferring the articles. The two endless belt members 4 are arranged in parallel with each other with a space being maintained between them. The transfer conveyor 1 has its inlet end side supported by a frame 5 and outlet end side supported by a supporting body 6.

Numeral 10 designates a separating conveyor that receives the articles transferred in the row by the transfer conveyor. The separating conveyor 10 has its articles receiving end side supported by the supporting body 6, wherein an articles receiving end portion of the separating conveyor 10 and an outlet end portion of the transfer conveyor 1 are arranged so as to butt with each other.

The separating conveyor 10 comprises two endless belt members 14 that are wound around pulleys 12, 13 for conveying the articles. The two endless belt members 14 are arranged in parallel with each other with a space being maintained between them. The separating conveyor 10 is provided to rotate swingably by an angle needed for each of separations of the articles in a horizontal plane around a pivot 11 that is provided in or below the outlet end portion of the transfer conveyor 1.

Swinging rotation of the separating conveyor 10 around the pivot 11 is effected by a construction in which an outlet end portion of the separating conveyor 10 (the left hand side in the figures) is placed slidably on a slide member 15 provided on a frame 19 so that the separating conveyor 10 is rotated to swing around the pivot 11 by drive of an air cylinder 16. The separating conveyor 10 is rotated by an angle needed for each of the separations of the articles.

Numeral 17 designates a first stopper provided in a middle portion of the separating conveyor 10. The first stopper 17 may be of an arbitrary structure if it engages with the articles transferred by the transfer conveyor 1 to stop their movement and description in detail thereof will be omitted.

At a position of the outlet end portion of the separating conveyor 10, a second stopper 18 is arranged in a space between the two belt members 14 arranged in parallel with each other to form the separating conveyor 10. The second stopper 18 is a device to abut a front one of the articles conveyed on the belt members 14 of the separating conveyor 10 so as to stop feeding-out thereof from the separating conveyor 10. Construction of the second stopper 18 will be described later.

Numeral 26 designates a counter that counts a number of the articles conveyed on the separating conveyor 10. Upon counting a predetermined number of the articles, the counter puts out an operating signal to the first stopper 17.

With respect to the articles separating and supplying apparatus constructed as illustrated and described above, construction of the transfer conveyor 1, separating conveyor 10 and second stopper 18 will be described next.

(The Transfer Conveyor 1)

Figure 1B:
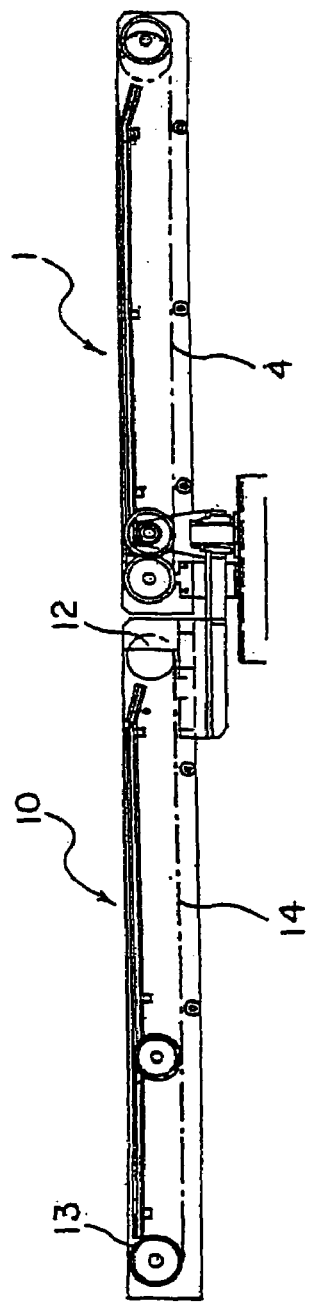

The transfer conveyor 1, as described with respect to FIGS. 1(a) and 1(b), comprises the two endless belt members 4 arranged in parallel with each other. The two endless belt members 4 are shown by reference numerals 4-1 and 4-2 in FIG. 2.

The transfer conveyor 1 is a device that transfers articles to be separated, wherein the articles to be separated are arrayed in one row. The construction of the transfer conveyor 1 is not limited to one having the two endless belt members as illustrated.

The articles to be transferred by the transfer conveyor 1 are packaged articles, for example, supplied from a packaging apparatus and the like of an upstream process but, needless to mention, there is no limitation in the articles to be handled.

Also, while the transfer conveyor 1 as illustrated has been described as one to transfer the articles arrayed in one row, the transfer conveyor 1 may be such one as transfers articles arrayed in a plurality of rows.

(The Separating Conveyor 10)

Next, the separating conveyor 10 will be described. The separating conveyor 10, as described in the above item of the Entire Construction, comprises the two endless belt members 14 arranged in parallel with each other and wound around the pulleys 12, 13 with a space being maintained between the two endless belt members 14. The two endless belt members 14 are shown by reference numerals 14-1 and 14-2 in FIG. 2.

Figure 2:
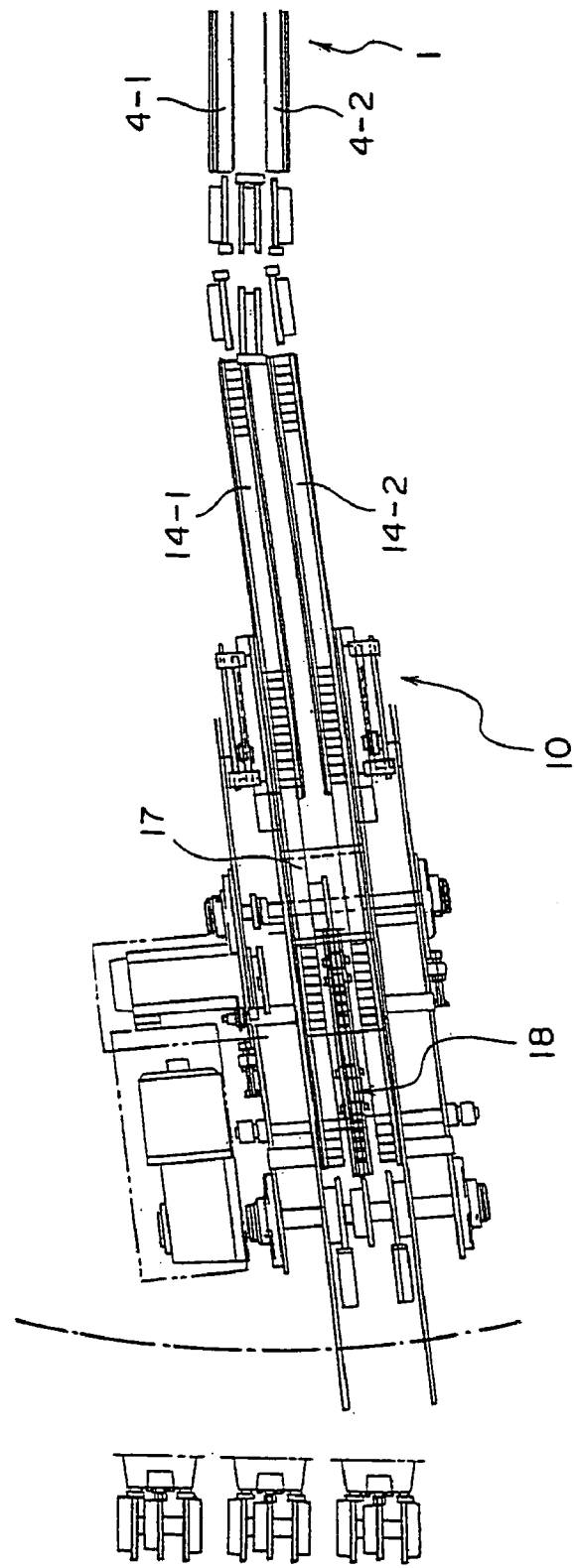
FIG. 2 is a plan view of a transfer conveyor 1 and a separating conveyor 10 of the apparatus of FIG. 1.

The separating conveyor 10 has its one end arranged so as to butt with the outlet end portion of the transfer conveyor 1, as described with respect to FIGS. 1(*a*) and 1(*b*), and this butting end portion of the separating conveyor 10 is provided to be rotated swingably around the pivot 11. The outlet end portion of the separating conveyor 10 is rotatable by an angle needed for each of the separations of the articles. An example of a mode of the rotation is shown in FIG. 2 by an arc of chain line and by front views of the separating conveyor 10 at three separation positions on the left end side of FIG. 2.

The first stopper 17, as described before, is provided in the middle portion of the separating conveyor 10 so as to function to stop movement of the articles conveyed on the belt members 14-1, 14-2 of the separating conveyor 10. Also, as described before, the second stopper 18 is provided on a downstream side of the first stopper 17. Construction of the second stopper 18 will be described next with reference to FIGS. 3(*a*) and 3(*b*).

(The Second Stopper 18)

Figure 3A:
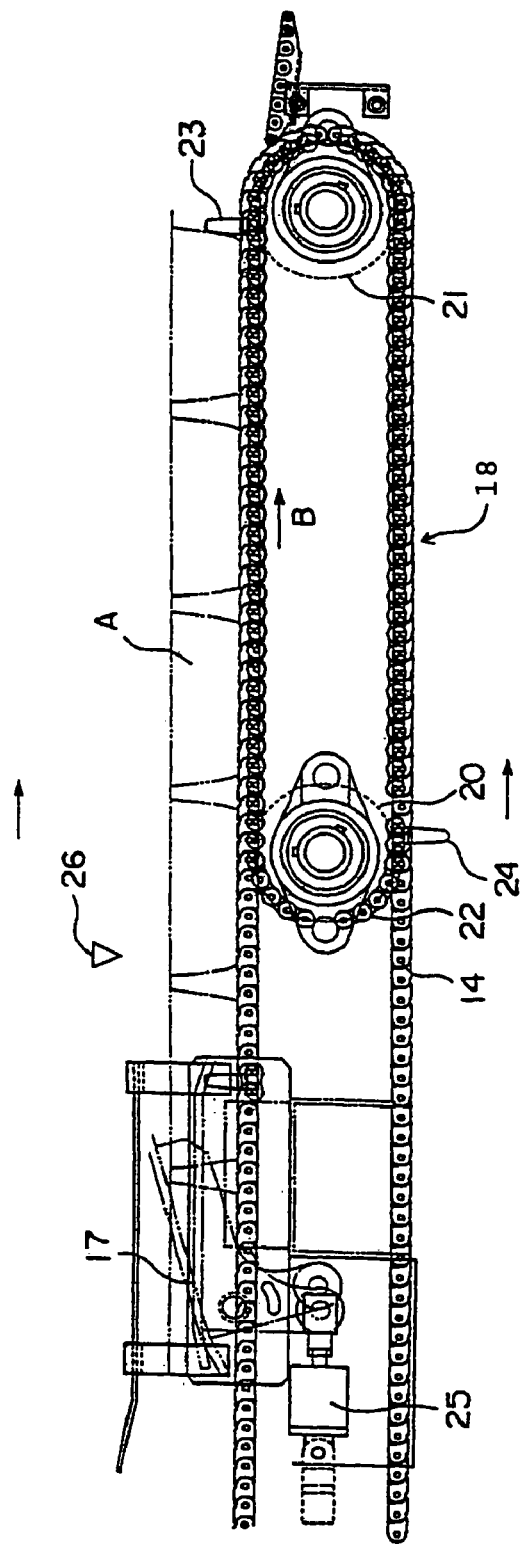
Figure 3B:
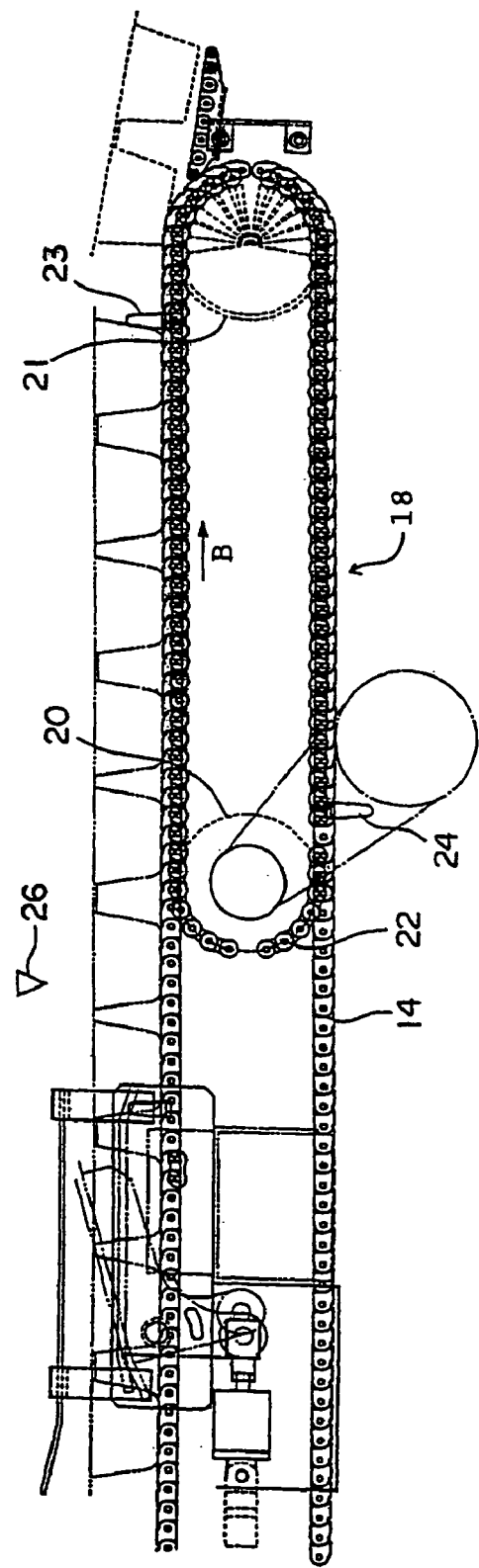

In FIGS. 3(*a*) and 3(*b*), the second stopper 18 comprises an endless belt 22 that is wound around pulleys 20, 21. This endless belt 22 comprises two engaging members 23, 24 that project from the endless belt 22 and are arranged with an interval being maintained between them in their running direction. The endless belt 22 is arranged between, and in parallel with, the two belt members 14-1, 14-2 forming the separating conveyor 10.

One of the engaging members 23, 24, that is, the engaging member 23 in the example shown in FIGS. 3(*a*) and 3(*b*), engages with a front one of articles A conveyed on the two endless belt members 14-1, 14-2 forming the separating conveyor 10 to stop movement thereof. Then, articles of a predetermined number to be separated are stopped and stored subsequently to and after the front one is so stopped. In FIG. 3(*a*), four packaged articles are stored after the engaging member 23. In FIG. 3(*b*), three of two consecutively packaged articles are stored after the engaging member 23. Construction of the device is made such that, when the articles of the predetermined number are so stored after the engaging member 23 provided projecting from the endless belt 22, it is detected by the counter 26 arranged in the middle of the separating conveyor 10. Type and construction of the counter 26 may be appropriately employed from the known art and description in detail thereof will be omitted.

As soon as the counter 26 detects the articles of the predetermined number fed in to be stored after the engaging member 23, the first stopper 17 is operated by an air cylinder 25 so that the first stopper 17 engages with the articles that are being conveyed on the endless belt members 14-1, 14-2 to stop movement thereof. Thereby, the articles A in excess of the predetermined number are prevented from being conveyed in a direction of the endless belt 22. Bottom surfaces of the articles A of which movement has been so stopped slide on upper surfaces of running endless belt members 14-1, 14-2.

When the articles A of the predetermined number to be separated are stored on the endless belt members 14-1, 14-2 on the downstream side of the first stopper 17, it is detected by the counter 26 and feeding-in of the articles A in excess thereof is stopped by the first stopper 17, as mentioned above. Then, the endless belt 22 is moved in a direction of arrow B in FIG. 3(*a*) and the articles A of the predetermined number that have been conveyed on the endless belt members 14-1, 14-2, forming the separating conveyor 10, and have been stopped by the engaging member 23 are thereby conveyed to the direction in which the articles of the predetermined number are placed being separated.

Figure 4:
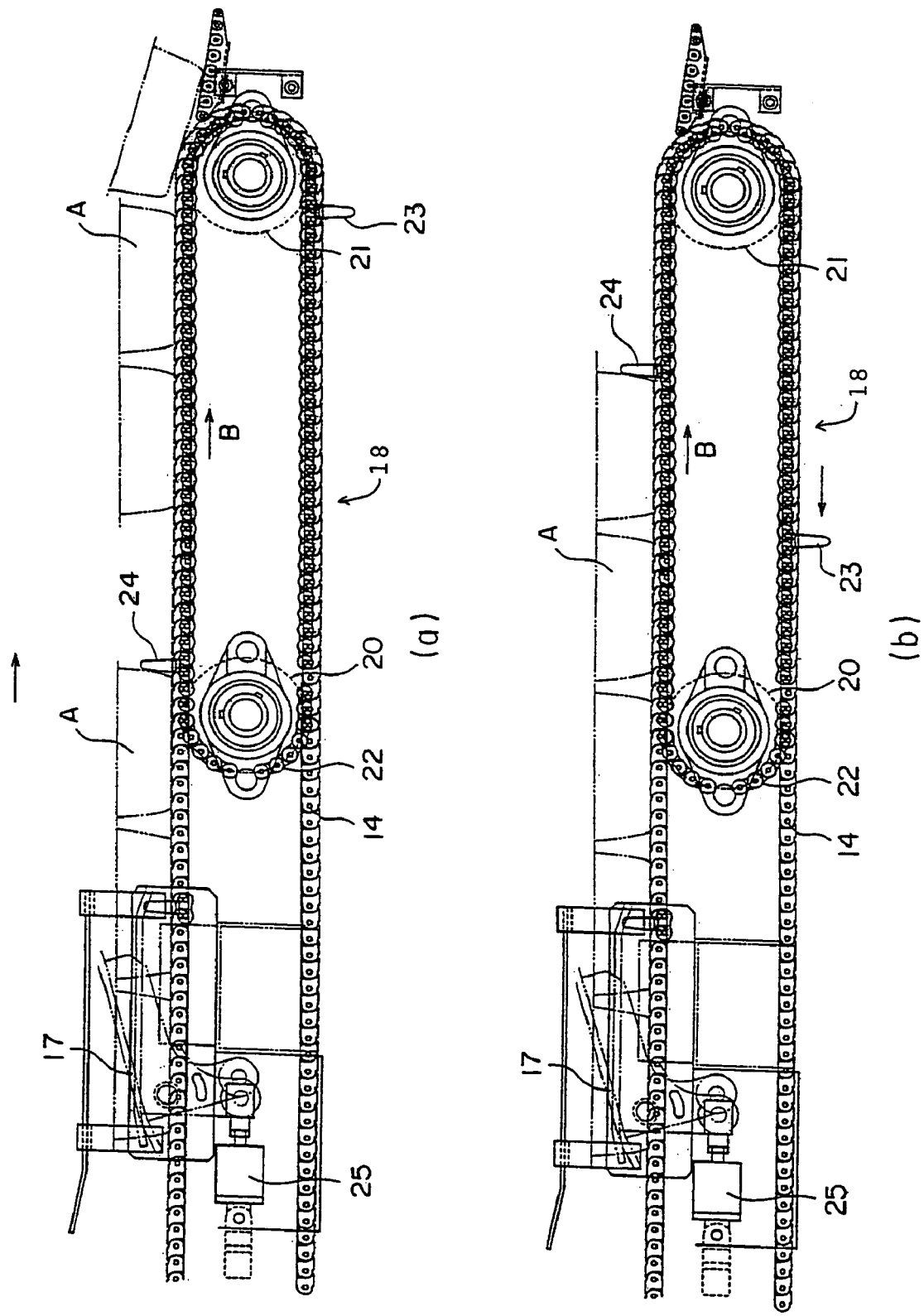

At this time, the endless belt 22 of the separating apparatus shown in FIG. 3(*a*) is in the state shown in FIG. 4(*a*), wherein the engaging member 24 is positioned downstream of the first stopper 17 and the articles of the predetermined number stored after the engaging member 23, as mentioned above, are in a process of being separated and, at the same time, the articles A of which movement has been stopped by the first stopper 17 are released to be conveyed toward the engaging member 24. Then, as shown in FIG. 4(*b*), the endless belt 22 is moved in the direction of arrow B together with the articles A that are being conveyed by the belt members 14-1, 14-2. When the engaging member 24 reaches a stop position of the engaging member 23 shown in FIGS. 3(*a*) and 3(*b*), that is a position of the front one of the articles of the predetermined number on the separation conveyor 10, the endless belt 22 is stopped and the articles of the predetermined number to be next separated are stored after the engaging member 24 so stopped.

As soon as the articles A of the predetermined number to be next separated are stored after the engaging member 24, the separating conveyor 10 is rotated to swing by a predetermined angle around the pivot 11, as described with respect to FIG. 2, so that the articles A of the predetermined number are further conveyed to be placed on a separation position different from the previous one.

Thus, the separating conveyor 10 is operated so as to separate articles such that the articles A of the predetermined number are arrayed in a plurality of rows and, once the articles A arrayed in a predetermined number of the rows are separated, these articles A are fed, as they are, into a box or container for a packaging purpose.

In order for the articles A of the predetermined number to be arrayed in a plurality of rows to be fed into a box or container, such a feeding technology as disclosed by Japanese Laid-open Patent Application Hei 10-264901, for example, may be employed.

According to the articles separating and supplying apparatus of the embodiment as illustrated and described above, the articles A that are being conveyed in a row can be securely separated into the articles A of the predetermined number and these articles A of the predetermined number can be arrayed in a plurality of rows.

While the present invention has been described based on one embodiment, the invention is not limited to this embodiment only but, needless to mention, may be added with various changes and modifications within the scope of the invention as defined by the appended claims.

For example, in the embodiment as illustrated, while a case of the three separation positions has been shown in FIG. 2, the number of the separation positions is not limited thereto but may be an arbitrary number of plurality.

Also, in the embodiment as illustrated, while rotation of the separating conveyor 10 is effected by the air cylinder 16, the means of the rotation is not limited thereto but may be other appropriate means, such as a motor.

Further, in the embodiment as illustrated, while transfer of the articles by the transfer conveyor is performed by the structure using the two endless belt members, the means of the transfer is not limited thereto but may be such a transfer conveyor as having an arbitrary structure if it can appropriately convey the articles where the articles to be separated are arrayed on a conveyor.

What is claimed is:

1. A separating and supplying apparatus comprising:
   a transfer conveyor for transferring arrayed articles to be separated and supplied; a separating conveyor having one end portion for receiving the articles from said transfer conveyor as the articles are transferred by said transfer conveyor;
   a first stopper for stopping transferring of the articles from said transfer conveyor to said separating conveyor after a predetermined number of the articles, after having been received by said separating conveyor, are positioned on a first portion of said separating conveyor; and
   a second stopper including an endless belt and a first stopper member projecting from said endless belt, such that upon movement and then stoppage of said endless belt said first stopper member becomes positioned at a stop location for stopping a front one of the articles of the predetermined number on said separating conveyor and thereby preventing conveyance of the articles of the predetermined number by said separating conveyor.

2. The apparatus according to claim 1, wherein said second stopper further includes a second stopper member projecting from said endless belt, such that upon additional movement and then stoppage of said endless belt
   (i) said first stopper member is moved from its stop location and becomes positioned at another location, and
   (ii) said second stopper member becomes positioned at a stop location for stopping on said separating conveyor a front one of articles of a predetermined number and thereby preventing conveyance of these articles by said separating conveyor.

3. The apparatus according to claim 2, wherein said separating conveyor is pivotably supported at said one end portion.

4. The apparatus according to claim 3, further comprising:
   a counter for counting the articles that are received onto the first portion of said separating conveyor,
   such that said first stopper is for stopping the transferring of the articles, from said transfer conveyor to said separating conveyor, when the articles counted by said counter becomes equal in number to the predetermined number.

5. The apparatus according to claim 4, wherein said separating conveyor includes two parallel endless belt members defining a space therebetween, and said endless belt of said second stopper is positioned in said space between said two parallel endless belt members.

6. The apparatus according to claim 2, further comprising:
   a counter for counting the articles that are received onto the first portion of said separating conveyor,
   such that said first stopper is for stopping the transferring of the articles, from said transfer conveyor to said separating conveyor, when the articles counted by said counter becomes equal in number to the predetermined number.

7. The apparatus according to claim 2, wherein:
   said separating conveyor includes two parallel endless belt members defining a space therebetween, and said endless belt of said second stopper is positioned in said space between said two parallel endless belt members.

8. The apparatus according to claim 1, wherein said separating conveyor is pivotably supported at said one end portion.

9. The apparatus according to claim 8, wherein said separating conveyor is pivotably supported at said one end portion about a vertical axis.

10. The apparatus according to claim 1, further comprising:
    a counter for counting the articles that are received onto the first portion of said separating conveyor,
    such that said first stopper is for stopping the transferring of the articles, from said transfer conveyor to said separating conveyor, when the articles counted by said counter becomes equal in number to the predetermined number.

11. The apparatus according to claim 1, wherein
    said separating conveyor includes two parallel endless belt members defining a space therebetween, and said endless belt of said second stopper is positioned in said space between said two parallel endless belt members.

12. A method of separating and supplying articles, comprising:
    using a transfer conveyor to transfer arrayed articles to be separated and supplied;
    receiving on one end portion of a separating conveyor said articles as transferred by said transfer conveyor;
    using a first stopper to stop transferring of said articles from said transfer conveyor to said separating conveyor after a predetermined number of said articles, after having been received by said separating conveyor, are positioned on a first portion of said separating conveyor; and
    using a second stopper, including an endless belt and a first stopper member projecting from said endless belt, to stop a front one of said articles of the predetermined number on said separating conveyor, and thereby prevent conveyance of said articles of the predetermined number by said separating conveyor, by positioning said first stopper at a stop location.

13. The method according to claim 12, wherein said second stopper further includes a second stopper member projecting from said endless belt, and further comprising:
    after using said second stopper to stop said front one of said articles of the predetermined number on said separating conveyor, moving and then stopping said endless belt such that
    (i) said first stopper member is moved from its stop location and becomes positioned at another location,
    (ii) said articles of the predetermined number are conveyed by said separating conveyor to a separation location, and
    (iii) said second stopper member becomes positioned at a stop location; and
    releasing said first stopper such that a predetermined number of said articles are conveyed until a front one of this predetermined number of articles is stopped by said second stopper member.

14. The method according to claim 13, further comprising:
pivoting said separating conveyor about said one end portion such that the articles stopped by said second stopper member become oriented to be conveyed by said separating conveyor to another separation location upon movement of said endless belt.

15. The method according to claim 14, further comprising:
using a counter to count said articles that are received onto said first portion of said separating conveyor,
such that using said first stopper to stop said transferring of said articles from said transfer conveyor to said separating conveyor comprises using said first stopper to stop said transferring of said articles from said transfer conveyor to said separating conveyor when the articles counted by said counter becomes equal in number to the predetermined number.

16. The method according to claim 15, wherein said separating conveyor includes two parallel endless belt members defining a space therebetween, and said endless belt of said second stopper is positioned between said two parallel endless belt members.

17. The method according to claim 13, further comprising:
using a counter to count said articles that are received onto said first portion of said separating conveyor,
such that using said first stopper to stop said transferring of said articles from said transfer conveyor to said separating conveyor comprises using said first stopper to stop said transferring of said articles from said transfer conveyor to said separating conveyor when the articles counted by said counter becomes equal in number to the predetermined number.

18. The method according to claim 13, wherein said separating conveyor includes two parallel endless belt members defining a space therebetween, and said endless belt of said second stopper is positioned between said two parallel endless belt members.

19. The method according to claim 12, further comprising:
pivoting said separating conveyor about said one end portion such that the articles stopped by said second stopper member become oriented to be conveyed by said separating conveyor to another separation location upon movement of said endless belt.

20. The method according to claim 12, further comprising:
using a counter to count said articles that are received onto said first portion of said separating conveyor,
such that using said first stopper to stop said transferring of said articles from said transfer conveyor to said separating conveyor comprises using said first stopper to stop said transferring of said articles from said transfer conveyor to said separating conveyor when the articles counted by said counter becomes equal in number to the predetermined number.

21. The method according to claim 12, wherein said separating conveyor includes two parallel endless belt members defining a space therebetween, and said endless belt of said second stopper is positioned between said two parallel endless belt members.

* * * * *